(12) United States Patent
Schneider (10) Patent No.: US 7,120,236 B1
(45) Date of Patent: Oct. 10, 2006

(54) MNEMONIC DISCOVERY AND NOTIFICATION METHOD, PRODUCT, AND APPARATUS

(76) Inventor: Eric Schneider, 13944 Cedar Rd., #258, University Heights, OH (US) 44118

( * ) Notice: Subject to any disclaimer, the term of this patent is extended or adjusted under 35 U.S.C. 154(b) by 634 days.

(21) Appl. No.: 09/681,448

(22) Filed: Apr. 7, 2001

Related U.S. Application Data (63) Continuation-in-part of application No. 09/650,827, filed on Aug. 30, 2000, now Pat. No. 6,901,436, and a continuation-in-part of application No. 09/440,606, filed on Nov. 15, 1999, now Pat. No. 6,442,549.

(51) Int. Cl.
*H04M 3/42* (2006.01)
*G06F 17/60* (2006.01)

(52) U.S. Cl. .................. 379/201.01; 705/1; 705/500

(58) Field of Classification Search .................. 705/1, 705/21, 26, 27, 400, 500; 379/211.01, 212.01, 379/213.01, 214.01, 354, 164, 88.19, 88.22, 379/142.06, 142.04, 93.23, 93.24, 112.01, 379/114.13, 201.01; 709/201, 203, 217, 709/218; 707/10, 100, 104.1; 455/445
See application file for complete search history.

(56) References Cited

U.S. PATENT DOCUMENTS

| | | | | |
|---|---|---|---|---|
| 4,811,382 A | * | 3/1989 | Sleevi | 379/67.1 |
| 5,321,740 A | * | 6/1994 | Gregorek et al. | 379/88.22 |
| 5,535,257 A | * | 7/1996 | Goldberg et al. | 340/7.3 |
| 5,598,464 A | * | 1/1997 | Hess et al. | 379/211.03 |
| 5,644,625 A | * | 7/1997 | Solot | 379/88.22 |
| 5,892,920 A | | 4/1999 | Armstrong et al. | 379/213.01 |
| 5,937,037 A | * | 8/1999 | Kamel et al. | 379/88.19 |
| 5,953,400 A | * | 9/1999 | Rosenthal et al. | 379/202.01 |
| 5,987,464 A | * | 11/1999 | Schneider | 707/10 |
| 5,991,368 A | * | 11/1999 | Quatse et al. | 379/88.25 |
| 6,009,150 A | * | 12/1999 | Kamel | 379/88.22 |
| 6,137,873 A | * | 10/2000 | Gilles | 379/202.01 |
| 6,141,408 A | | 10/2000 | Garfinkle | 379/201.01 |
| 6,181,787 B1 | * | 1/2001 | Malik | 379/207.11 |
| 6,393,117 B1 | * | 5/2002 | Trell | 379/207.1 |
| 6,442,549 B1 | * | 8/2002 | Schneider | 707/10 |
| 6,532,366 B1 | * | 3/2003 | Chung et al. | 455/445 |
| 6,603,844 B1 | * | 8/2003 | Chavez et al. | 379/114.13 |
| 6,608,891 B1 | * | 8/2003 | Pelletier et al. | 379/207.02 |
| 6,901,436 B1 | | 5/2005 | Schneider | 709/219 |

FOREIGN PATENT DOCUMENTS

JP 54136617 * 10/1979

OTHER PUBLICATIONS

FAX-Phone Switch for Multi-Ring Telephone Lines; Derwent Abstract; Jul. 1992.*
What Words are Hiding in you phone Njumber? Internet print-out of www.dialabc.com; WaybackMachine.*
What does your phone number spell? Internet print-out of www.phonespell.com; WaybackMachine.*
www.phonetic.com; Internet print-out; WaybackMachine.*

* cited by examiner

*Primary Examiner*—Igor N. Borissov (57) ABSTRACT

When any user request other than that of a phone number subscription request is received from a user, it may be determined whether a subscription request is offered to the user in response to the received request. When an offer is to be provided, a phone number subscription request may be offered either before, during, or after processing the received request.

21 Claims, 12 Drawing Sheets

TELEPHONE BILL FOR JOHN DOE FROM 04/01/99-05/01/99
For Telephone Number: 216-555-1234
610

TOTAL DUE: $103.95

Dear John,

It has come to our attention that the following telephone numbers are currently available:
1-216-555-1233  1-216-555-1235  1-216-555-1243  1-216-777-1234
1-330-555-1234  1-800-555-1234
630
Call 1-800-TELENAMES to subscribe to any of these available phone numbers.

It has come to our attention that the following domain names are available:
555-1234.COM  216-555-1234.COM  615
555-1234.NET  216-555-1234.NET Most customers select a domain name of this form:
216-555-1234.COM
625                                  620
If you would like us to reserve for you this or any other domain name
then contact us at 1-800-TELENAMES
or visit our website at www.telenames.com for more details.

Upon reservation, Registrar fees plus any other charges
for related services will be applied to your next phone bill.

Best Regards,
Your Phone Company

MNEMONIC DISCOVERY AND NOTIFICATION METHOD, PRODUCT, AND APPARATUS

CROSS REFERENCE TO RELATED APPLICATIONS

This application claims the benefit of the filing date of U.S. Pat. No. 6,901,436 to Schneider, application Ser. No. 09/650,827, filed Aug. 30, 2000; which is incorporated herein by reference.

This application is also related to U.S. Pat. No. 6,442,549 to Schneider, application Ser. No. 09/440,606, filed Nov. 15, 1999; which is incorporated herein by reference.

BACKGROUND OF INVENTION

1. Field of the Invention

This invention generally relates to notification services, and more specifically relates to a method, product, and apparatus for providing available identifier notification services.

2. Description of the Related Art

In a communication network, a telephone number is placed on an Intercept status if the number has changed or if the line has been disconnected. Calls placed to numbers on intercept, which therefore cannot be completed as dialed, are routed instead to an intercept system. Such system may provide a message to the caller with an appropriate announcement, determination of which may be made by accessing an intercept data base. For example, if the database indicates a change of the telephone number, the announcement can inform the caller of the new or referral number. If instead the called line has been disconnected without change of number, the message can notify the caller of the inactive status.

Telecommunication carriers also offer the recording of a forwarding number and a disconnection message. If a party changes its number and leaves a new forwarding number, a message is played when an incoming call is received notifying the calling party that the number has been changed. None of the above described services provide further real-time subscriber services in an easy to use menu driven structure when an incomplete call occurs. For instance, telephone numbers that are changed, disconnected, or on Intercept status may be available for subscription.

When a phone subscriber initiates contact with the phone service provider, the provider may try to sell additional services (e.g., call waiting, call forwarding, voice mail, etc.) in conjunction with the subscriber's current phone number. However there are no such providers who provide further services of notifying a subscriber of the availability of additional phone numbers. When a phone subscriber is interested in subscribing to an additional phone number, it remains the onus of the subscriber to initiate a request for additional phone lines. Even when such requests are initiated, there are no tools that the subscriber and/or provider can use for selecting additional available telephone numbers that may be of desire and interest to the subscriber.

Accordingly, in light of the above, there is a strong need in the art for a method, product, and apparatus for providing subscriber notification services.

SUMMARY OF INVENTION

The present invention provides subscriber notification services in response to requests from a phone subscriber other than that of a phone number subscription request. The invention enables further options in response to detecting a disconnected or non-working phone number. The present invention integrates name generation and domain name information services into a telephone ordering and service system. The invention enables a stream of available phone numbers to be pushed via subscriber notification services. The present invention assists providers with name generation and the suggestive selling of available identifiers such as phone numbers.

The present invention detects and/or generates identifiers in response to real-time data streams from input sources such as instant messaging, chat rooms, web conferencing, interactive television, of from any broadcast. The invention allows for the modification of documents, bills, and messages that suggest desirable identifiers to customers that are available for registration (e.g., listing to a subscriber the availability of a consecutive phone number or the same phone number across other area codes, or across TLDs of the DNS). The present invention generates personalized identifiers in response to caller ID, user logins, automated dialing programs, and bulk message programs.

In general, in accordance with the present invention, with a subscriber having a first phone number, a method for notifying the subscriber including the steps of determining that at least one second phone number is available, and communicating to the subscriber, the availability of the at least one available second phone number.

In accordance with other aspects of the present invention, a method for notifying a subscriber includes the steps of generating a first list having at least one available phone number, generating a second list having at least one subscriber, each subscriber having at least one subscriber phone number wherein each subscriber phone number corresponds to the at least one available phone number, and communicating with at least one subscriber from the second list to notify the subscriber of at least one available phone number corresponding to at least one subscriber phone number from the first list.

In accordance with yet other aspects of the present invention, in a communication network, a method for processing a phone call including the steps of receiving dialed digits from a calling party corresponding to a phone number, attempting to place a phone call connection from the calling party through the network to the phone number, determining that the phone number is one of a changed phone number and disconnected phone number, and communicating with the calling party to determine whether the calling party may be interested in subscribing to one of a phone number and any available phone number.

In addition, communicating to the subscriber may include the step of determining whether the subscriber is interested in subscribing to any of the available second phone number and/or automatically communicating to the subscriber in response to determining that the at least one second phone number is available.

Communicating to the subscriber may also include the step of notifying the subscriber from one of a placing a phone call, sending a mailpiece, sending a network communication, and receiving a communication from the subscriber wherein the received communication is any communication other than that of a subscriber initiated request for subscribing to an available phone number. The received communication from the subscriber may be received from one of a phone call, mailpiece, and network communication. The mailpiece may be one of a portable storage media, letter, postcard, and utility bill, the phone call may be one of a voice, data, and fax, and the network communication may be one of a URI, e-mail, bill, and web page data.

At least one second phone number may be generated from the first phone number and/or at least one more subscriber phone number for each generated second phone number. The first phone number and each second phone number may include a plurality of digits and each second phone number may differ by at least one digit from the first phone number. The first phone number and second phone number may be one of a contiguous/consecutive, same area code, same carrier, same central/local exchange, and same block of 10, 100, 1000, or 10,000 numbers.

Communicating to the subscriber may also include the step of processing a phone call in a communication network to the first phone number. Processing the phone call may include the steps of receiving dialed digits from a calling party corresponding to the first phone number, placing a phone call connection from the calling party through the network to a called party of the first phone number, and communicating with the called party to determine whether the called party is interested in subscribing to at least one available second phone number. The phone call connection between the calling party and the called party may be placed through a one of a land line public switched telephone network, cellular network, AIN network, ATM, and IP telephony. The calling party may be one of a service provider, telephone operator, and directory assistance provider.

Communicating with the called party may include the step of presenting a menu including options for one of a contacting the calling party and subscribing to at least one available second phone number. Dialed digits entered by the calling party may be received on a telephone keypad, the digits identifying a selected one of the options listed in the menu. Received speech from the calling party may be captured, the captured speech identifying a selected one of the options listed in the menu.

A subscriber a filter list having at least one second phone number may be received before determining whether the at least one second phone number is available. Determining that at least one second phone number is available may include the step of comparing the generated second phone number to the filter list.

In accordance with yet additional aspects of the present invention, a system which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

DETAILED DESCRIPTION

The present invention will now be described with reference to the drawings, wherein like reference numerals are used to refer to like elements throughout.

Figure 1A:
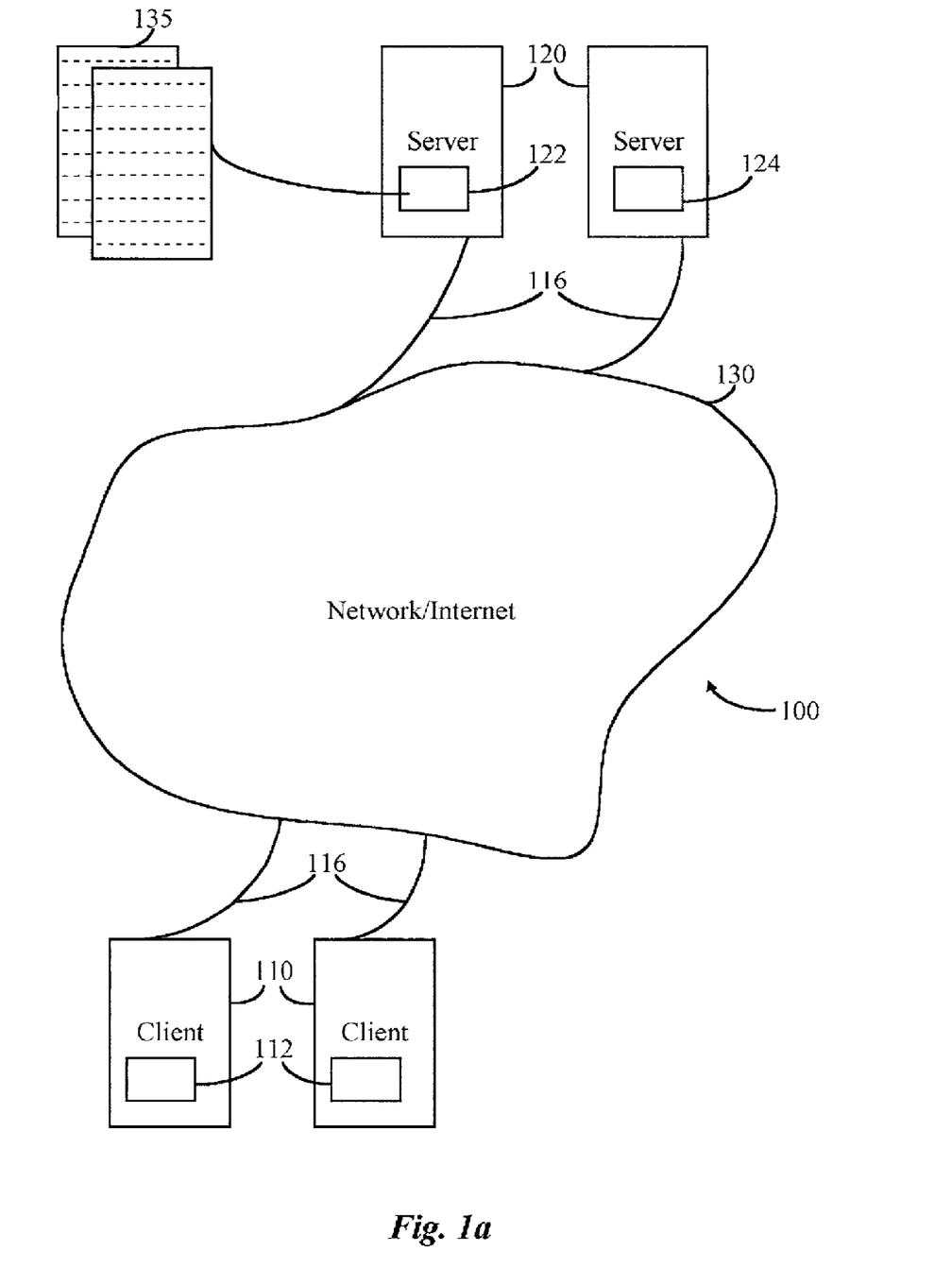
FIG. 1a is a block diagram of an exemplary distributed computer system in accordance with the present invention.

FIG. 1a illustrates an exemplary system for providing a distributed computer system 100 in accordance with one aspect of the present invention and may include client computers or any network access apparatus 110 connected to server computers 120 via a network 130. The network 130 may use Internet communications protocols (IP) to allow the clients 110 to communicate with the servers 120. The communication device of a network access apparatus 110 may include a transceiver, a modem, a network interface card, or other interface devices to communicate with the electronic network 130. The network access apparatus 110 may be in operative association with a Global Positioning System (GPS) via a GPS receiver. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may also be accessed via an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/ smaller computer systems. It is noted that the network access apparatus 110 may have a variety of forms, including but not limited to, a general purpose computer, a network computer, a network television, an internet television, a set top box, a web-enabled telephone, an internet appliance, a portable wireless device, a television receiver, a game player, a video recorder, and/or an audio component, for example.

Each client 110 typically includes one or more processors, memories, and input/output devices. An input device may be any suitable device for the user to give input to client computer system 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

For example, input/output device may be a standard touch-tone telephone. However, the network transport may be intercom circuits, Integrated Services Digital Network (ISDN) lines, T1 lines, POTS lines, modem lines, video lines, and Ethernet Hub. Advanced network information such as Automatic Number Identification ("ANI") (also known as caller ID) and Dialed Number Identification Service ("DNIS") may be passed by the network and recognized by the system. ANI or DNIS may be used to identify area code of the subscriber, registrant, or customer accessing the system 100.

Telephony circuits may include, among other circuits, circuits for interfacing with input/output devices. These circuits may include a voice circuit having a touch-tone recognition circuit and voice processing circuit, as well as other functions. Other circuits may include switching circuits, text to speech circuits, facsimile ("fax") circuits, automatic speech recognition circuits, multimedia circuits, modem circuits, video circuits, and adapter circuits. These circuits may enable subscribers or others to input information by way of touch tones, pulses, voice, video, or equivalents thereof. Other input and output devices for accessing system may also include television signals, wireless communication devices, Internet devices and electronic mail devices. In alternate embodiments, voice recognition signatures may be recognized by a system using speech recognition circuits.

As is known in the art, telephone calls may be routed from a calling Subscriber to a called Subscriber through a network of switches. Subscribers connected to a common switch may be assigned a unique directory number, NXX-XXXX, where "N" refers to any digit except 0 or 1 and "X" refers to any one of 10 digits. As is also known in the art, the telephone system divides the United States into "area codes"; more technically referred to as Numbering Plan Area (NPA) codes. When a call is made from one "area code" to another "area code", the three digit Numbering Plan Area code, NPA, prefix must be supplied to the called Subscriber's directory number (DN). Thus, in effect, each telephone Subscriber is associated with a unique ten digit directory number; NPA-NXX-XXXX.

The servers 120 may be similarly configured. However, in many instances server sites 120 include many computers, perhaps connected by a separate private network. In fact, the network 130 may include hundreds of thousands of individual networks of computers. Although client computers 110 are shown separate from the server computers 120, it is understood that a single computer might perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 135. The pages 135 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 135. The browser programs 112 enable users to enter addresses of specific Web pages 135 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
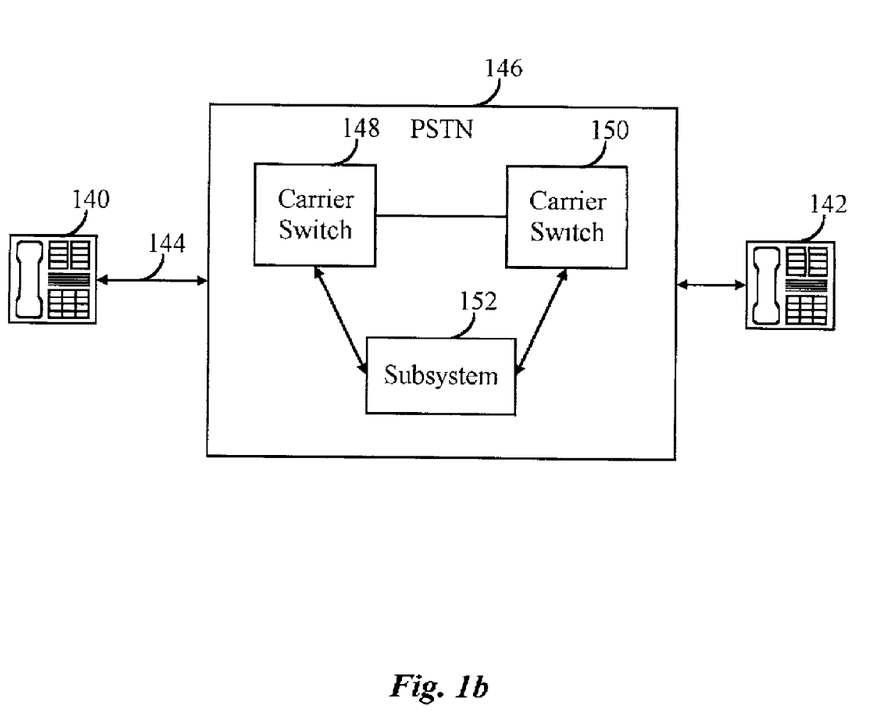
FIG. 1b is a block diagram of an exemplary public switched telephone network (PSTN) having a subsystem in according with the present invention.

Referring to FIG. 1b, a simplified block diagram illustrates where in the public switched telephone network (PSTN) the subscription system resides in according with the present invention. A calling party places a telephone call via telephone 140 to called party's phone 142 in a conventional manner. The telephone call is transmitted through line 144 to a PSTN 146 comprising a configuration of interconnected switches, illustrated by way of example by switches 148 and 150, associated with a particular telecommunications carrier. The phone call connection between the calling party and the called party may be placed through a one of a land line public switched telephone network, wireless network, cellular network, AIN network, ATM, and IP telephony. The calling party may be one of a subscriber, service provider, telephone operator, and directory assistance provider.

The menu system according to the principles of the present invention may reside in subsystem 152 resident in an adjunct platform that communicates with the switching network. Alternatively, the subsystem 152 can be embedded in the switching network. When a telephone call is placed from the calling party phone 140 to the called party phone 142, the switching network accesses the subsystem 152. The system provides the calling party with a plurality of menu options as will be described in more detail below. The system can also be configured such that depending on what menu option is selected, the system accesses that particular function resident on a separate platform. The menu options are provided to the calling party on a real-time basis in that the calling party receives the options during the original call flow. The calling party is not required to terminate the original call and enter a series of numbers on their telephone keypad in order to initiate a particular telephone call.

Figure 1C:
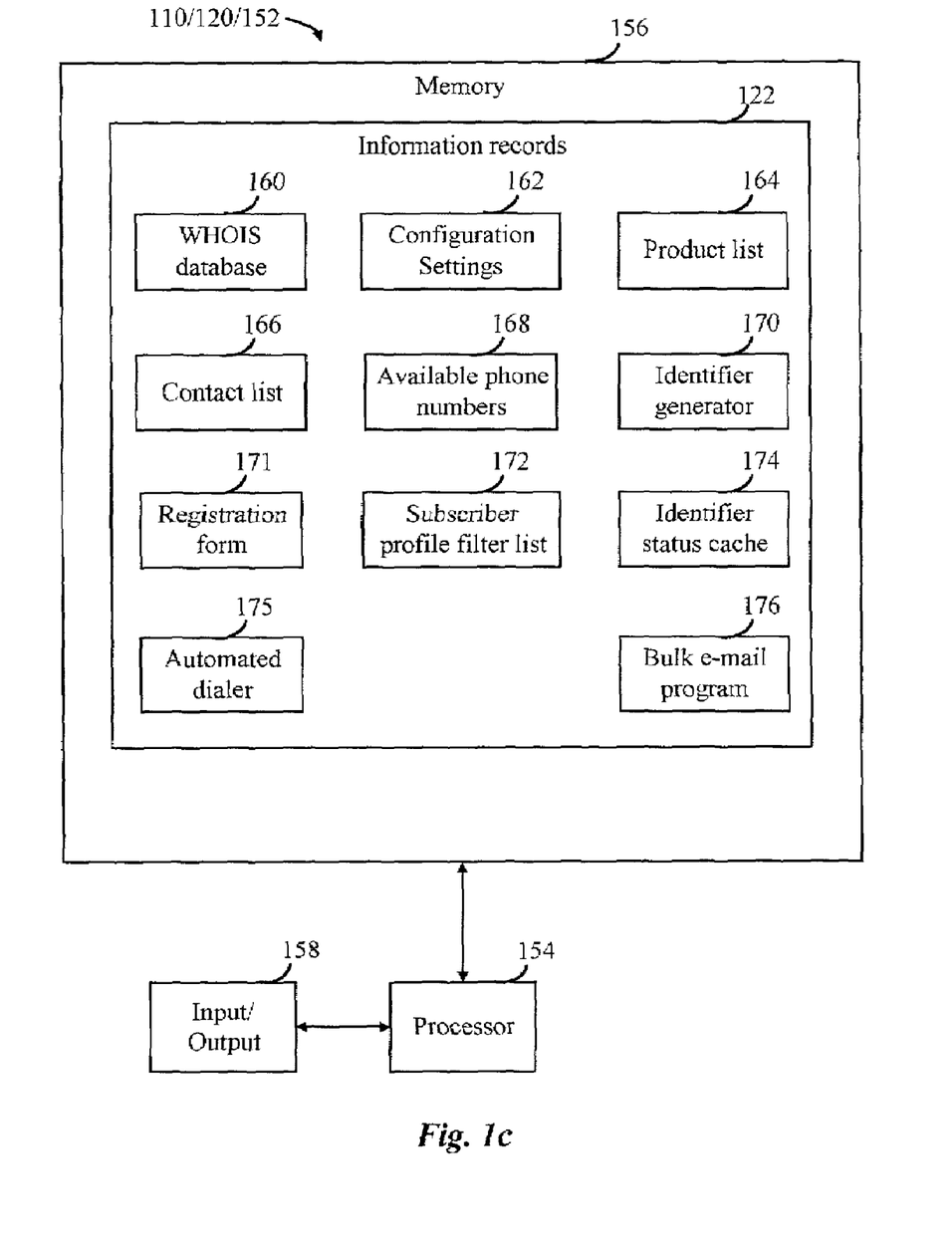
FIG. 1c is a block diagram illustrating exemplary information records stored in memory in accordance with the present invention.

FIG. 1c illustrates a block diagram of a storage device such as memory 156 in operative association with a processor 154. The processor 154 is operatively coupled to input/output devices 158 in a telephone subsystem 152, client 110 and/or server 120 computing system. Stored in memory 156 may be programs, scripts, and information records 122 having any combination of exemplary content such as computer executable instructions, program code, interface elements, lists, files, and databases. Such records may include for example: WHOIS database 160, configuration settings 162, product list 164, contact list 166, available phone number database 168, identifier generator 170, registration form 171, subscriber profile filter/watch list 172, identifier registry/status cache 174, automated dialer program 175, and bulk e-mail program 176. These memory elements 156 may be further introduced and discussed in more detail throughout the disclosure of the present invention.

Figure 1D:
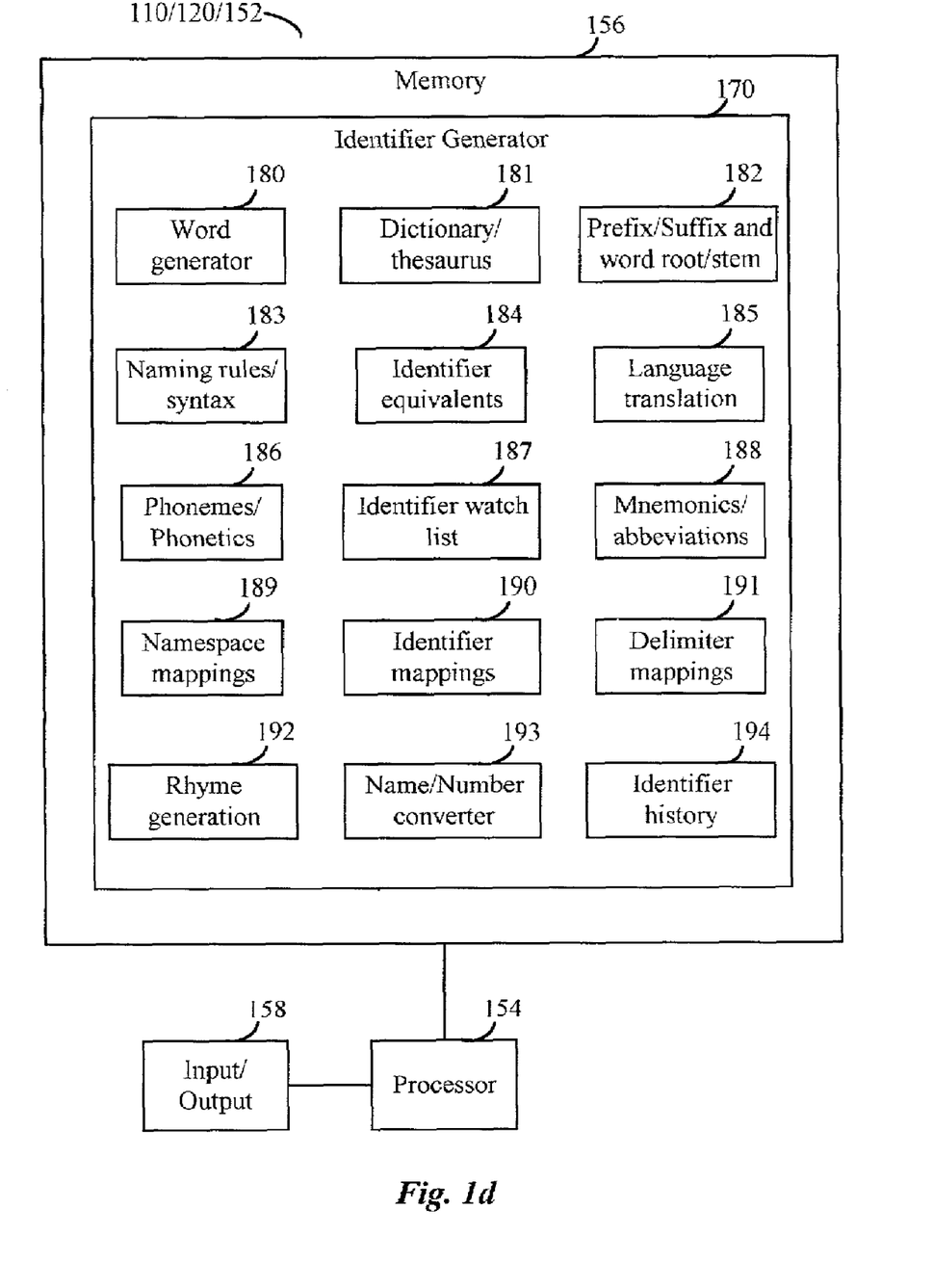
FIG. 1d is a block diagram illustrating identifier generator components stored in memory in accordance with the present invention.

FIG. 1d illustrates a block diagram of a storage device such as memory 156 in operative association with a processor 154. The processor 154 is operatively coupled to input/output devices 158 in a telephone subsystem 152, client 110 and/or server 120 computing system. Stored in memory 156 are elements/components of an identifier generator 170. Such components may include for example: word generation methods 180, dictionary/thesaurus 181, prefix/suffix and word root/stem 182, set of heuristic naming rules/namespace syntax 183, identifier equivalents 184, language translation 185, phonetics/phonemes (e.g., misspelling) 186, identifier watch list 187 (e.g., list of desirable descriptors, personal identifier portfolio, competitor identifier portfolio), mnemonics/abbreviations 188, namespace mappings 189, identifier mapping 190, delimiter mapping 191, rhyme generation 192, name/number conversion 193, and identifier history 194. These identifier generator components 170 may be further introduced and discussed in more detail throughout the disclosure of the present invention.

As discussed in U.S. patent application Ser. No. 09/440,606 filed Nov. 15, 1999, by Schneider, entitled "Method and apparatus for information delivery", a subscriber/client may execute a program to generate mnemonic conversions of telephone numbers into letters or combination of letters/numbers for selecting what phone numbers might have a personal significance, or commercial purpose, etc. helping the public to identify potentially newly available desirable telephone numbers in advance. Though implied, the use of such naming tool programs on the provider side adds value by being able to generate available desirable names that are suggested to the customer, subscriber, or registrant. Suggestive selling of available identifiers creates a "push" business model and generates more revenue by targeting desirable identifiers to recipients.

Figure 2:
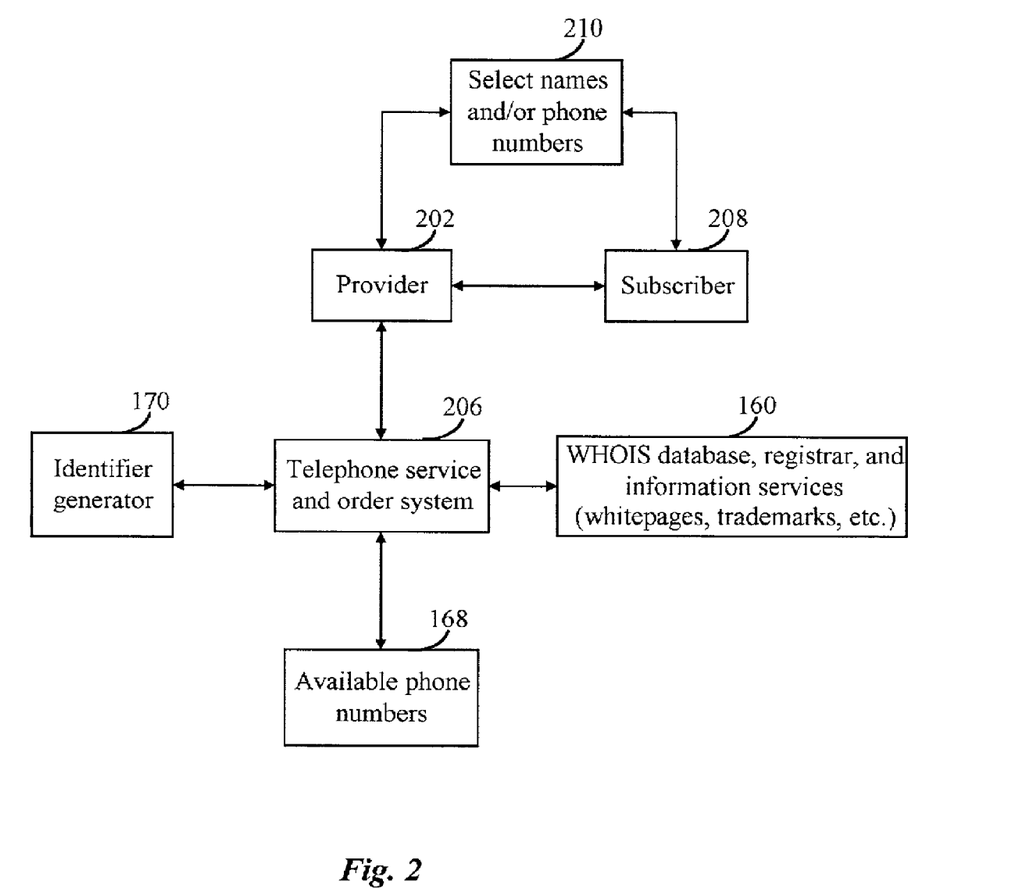
FIG. 2 is a block diagram depicting how a provider may assist a subscriber with the selection of an identifier in accordance with the present invention.

FIG. 2 illustrates a telephone operator/provider 202 enabled to use an identifier generator 170 that can be in operative association to a telephone service and order system 206 to convert the numberspace of a phone number into an equivalent namespace mnemonic of the same phone number or vice-versa. There is a cooperation and negotiation that occurs between a telephone subscriber 208 and operator/provider 202. Input words 210 may be supplied to the operator and are used in conjunction with the name generating program 204 (operates upon the rules of a telephone namespace) and may further integrate with a database 168 of all available telephone numbers to help the telephone operator 202 return a selection of acceptable phone numbers to the subscriber 208. A WHOIS database 160 for domain names may also be coupled to the telephone service and order system 206 for an operator to retrieve "411" information on domain names.

Figure 3A:
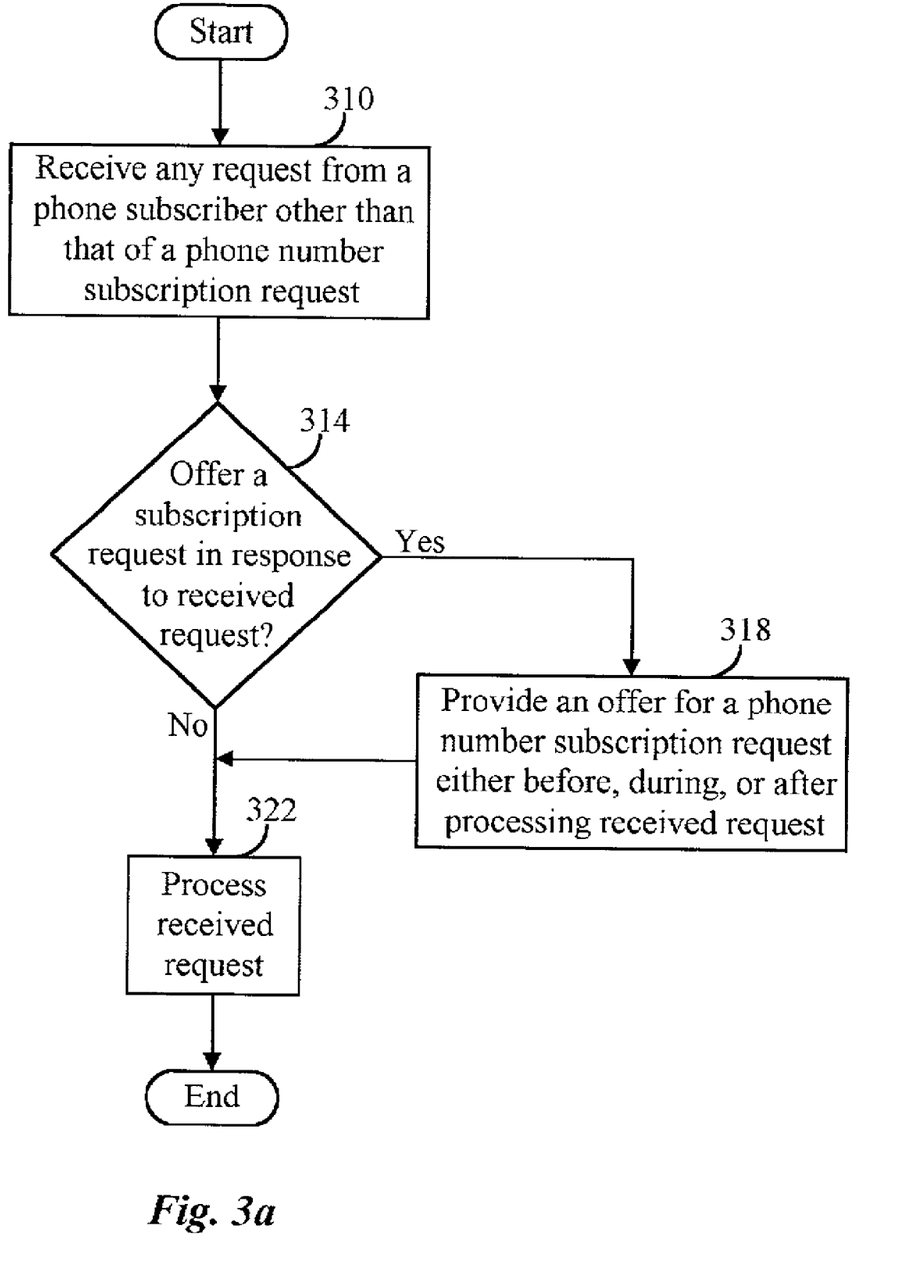
FIG. 3a is a flowchart illustrating the steps performed for processing a received request in accordance with the present invention.

FIG. 3a is a flowchart illustrating the steps performed for processing a received request. When any request other than that of a phone number subscription request is received in step 310 from a user/subscriber, it may be determined in step 314 whether a subscription request is offered to the user/subscriber in response to the received request (step 310). When an offer is to be provided, a phone number subscription request may be offered in step 318 either before, during, or after processing the received request in step 322. The request (step 310) may be processed in step 322 regardless of whether the subscription request (step 314) is offered/provided or not.

Figure 3B:
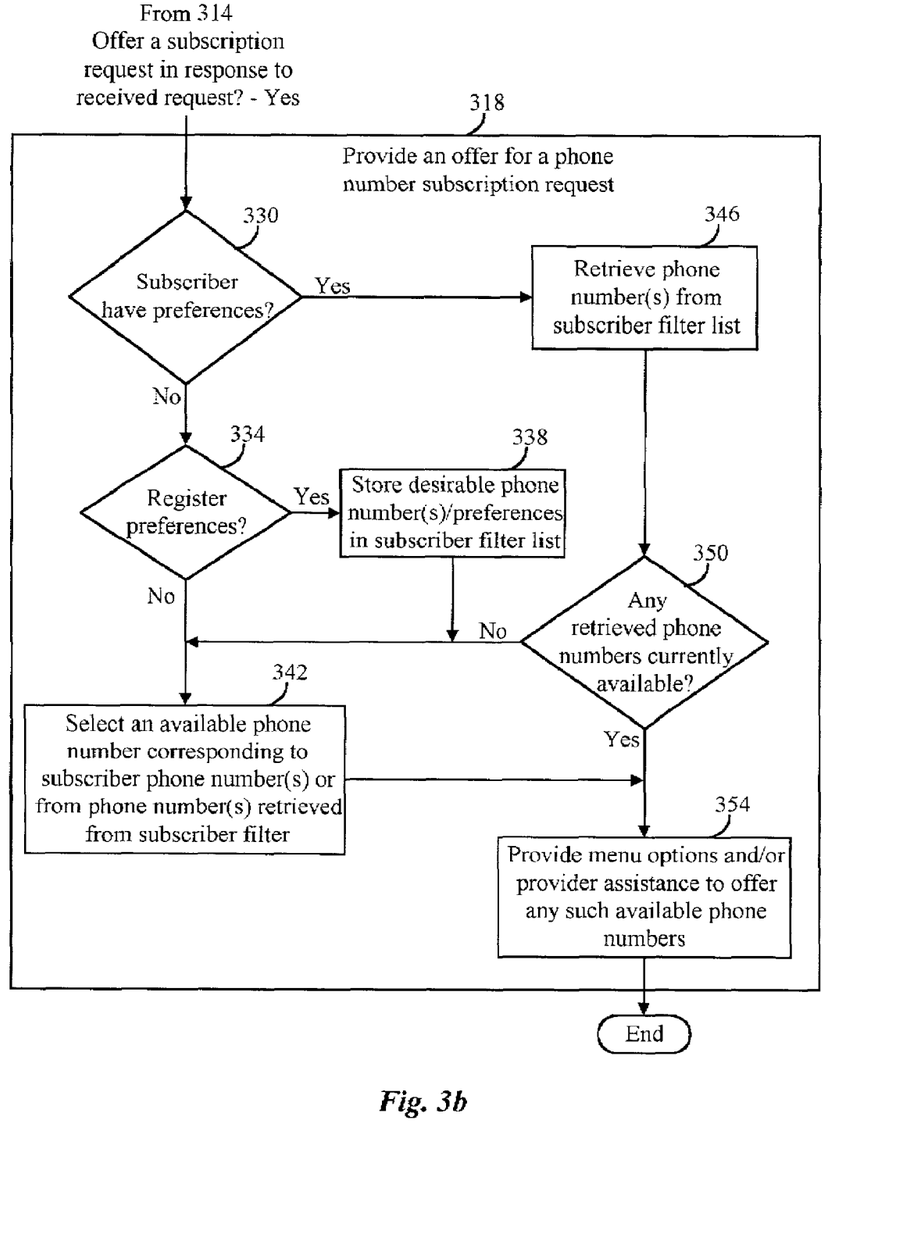
FIG. 3b is a flowchart illustrating the steps performed for providing an offer for a phone number subscription request in accordance with the present invention.

FIG. 3b is a flowchart illustrating the steps performed for providing an offer for a phone number subscription request. More specific steps may be performed when a subscription request is offered in response to a received request (step 314). It may be determined in step 330 whether the subscriber has any preferences. If not, then the subscriber may be given the opportunity to register preferences in step 334. When the subscriber would like to register preferences, then the subscriber may select/submit and store in step 338 desirable phone number(s)/preferences in a subscriber filter list. After registering preferences, or declining to register preferences an available phone number corresponding to subscriber phone number(s) or from phone number(s) retrieved from subscriber filter may be selected in step 342.

When it is determined in step 330 that the subscriber has preferences, then stored phone number(s) may be retrieved in step 346 from subscriber filter list and it may be further determined in step 350 whether any of the retrieved phone numbers are currently available. If not, then an available phone number corresponding to subscriber phone number(s) or from phone number(s) retrieved from subscriber filter may be selected in step 342. After selection (step 342) or when it is determined in step 350 that any retrieved phone numbers are currently available, then menu options and/or provider assistance may be provided in step 354 to offer any such available phone numbers.

Figure 4A:
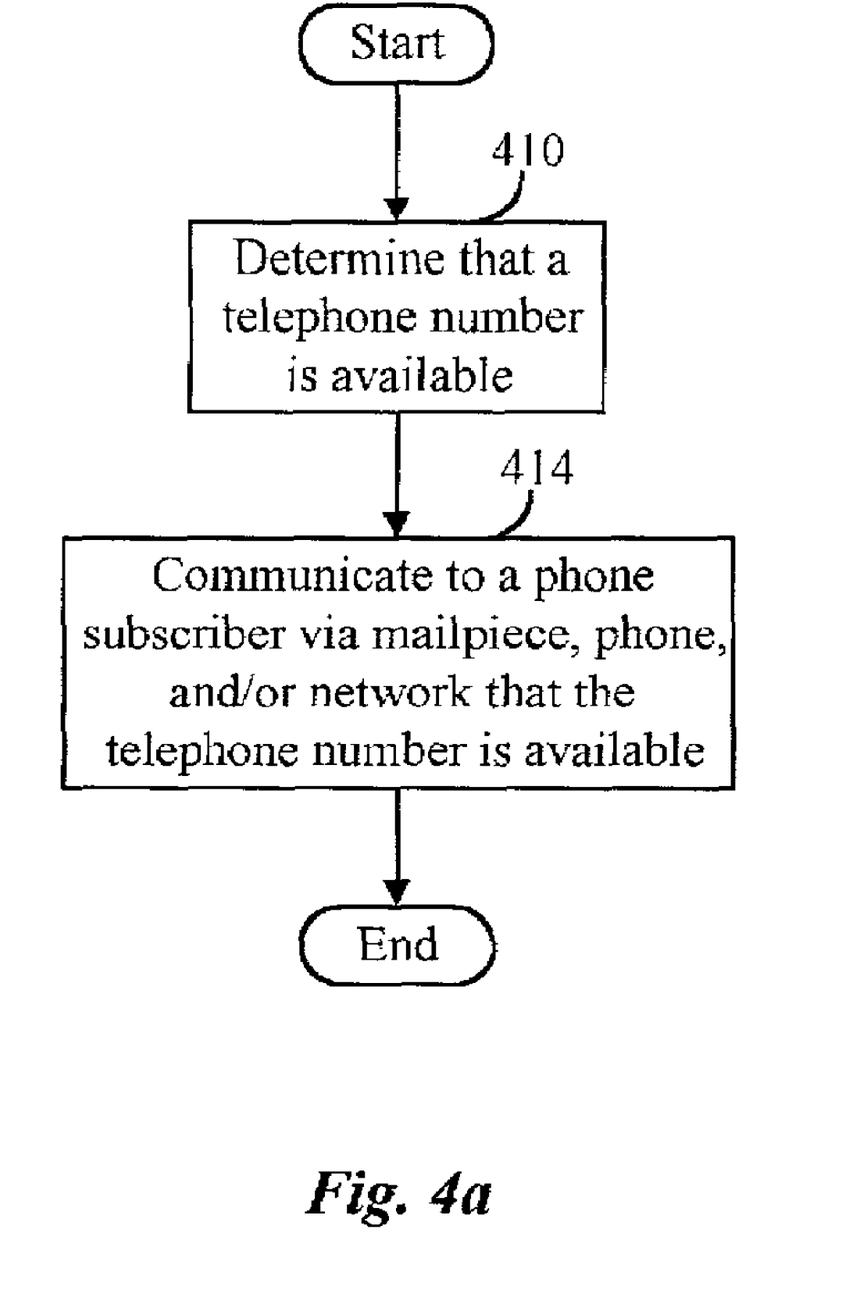
FIG. 4a is a flowchart illustrating the steps performed for communicating to an existing phone subscriber of the availability of a phone number in accordance with the present invention.

FIG. 4a is a flowchart illustrating the steps performed for communicating to an existing phone subscriber of the availability of at least one phone number. When it is determined in step 410 that a telephone number is available it may then be communicated to a phone subscriber in step 414 that the telephone number is available. The subscriber may be contacted via a mailpiece, telephone (e.g., voice, data, fax, etc.), and/or network (e.g., Internet). For instance, a phone subscriber having the phone number "216-555-3456" may wish to be informed if and when phone numbers such as "216-555-3455" and "216-555-3457" become available.

Figure 4B:
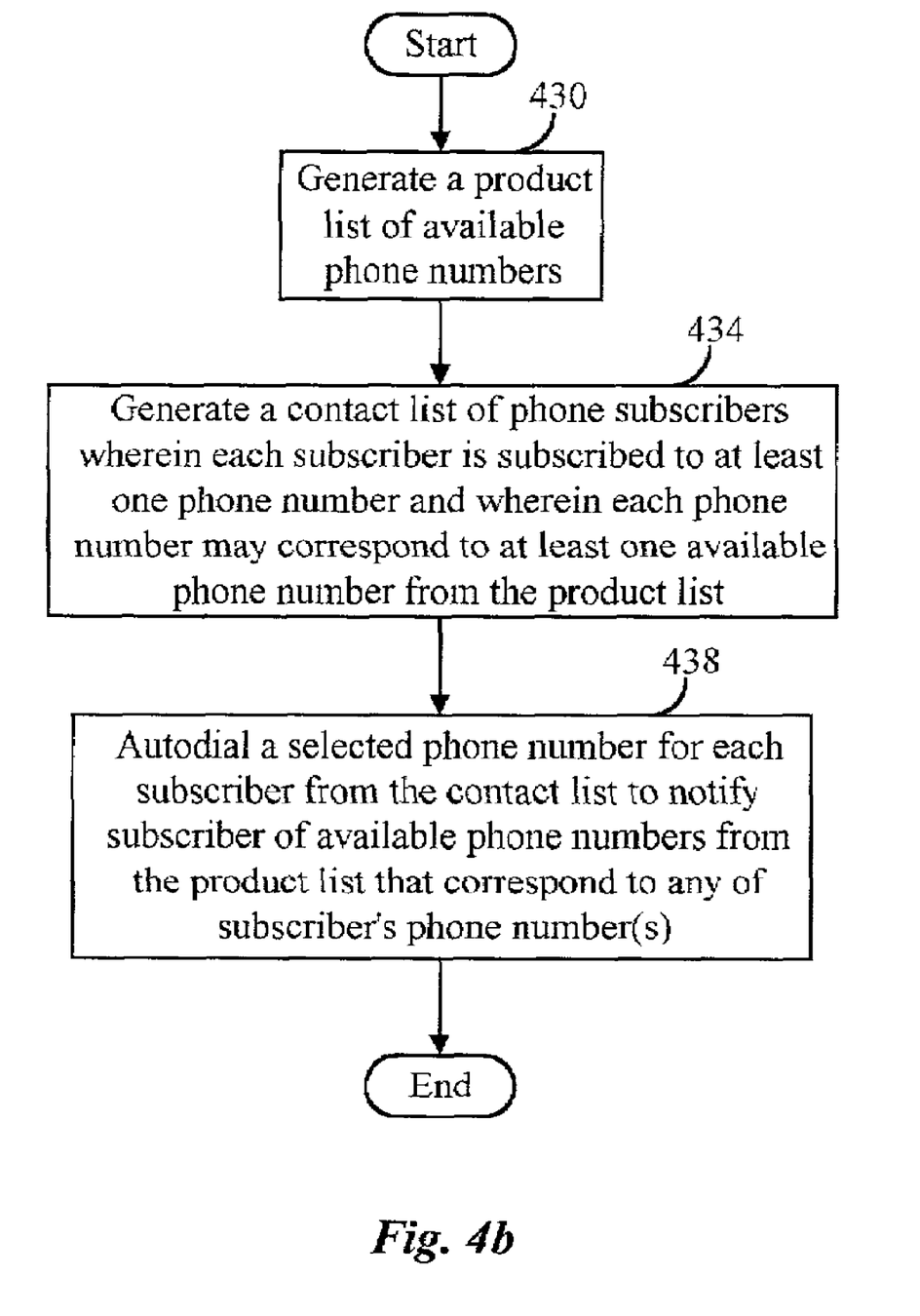
FIG. 4b is a flowchart illustrating the steps performed for generating available phone numbers and a contact list of phone subscribers in accordance with the present invention.

FIG. 4b is a flowchart illustrating the steps performed for generating available phone numbers and a contact list of phone subscribers. A product list of available phone numbers may be generated in step 430 and a contact list of phone subscribers wherein each subscriber is subscribed to at least one phone number and wherein each phone number may correspond to at least one available phone number from the product list may also be generated in step 434. When such product and contact lists are generated and/or accessed a selected phone number for each subscriber from the contact list may be autodialed in step 438 to notify subscriber of available phone numbers from the product list that correspond to any of subscriber's phone number(s).

Figure 5:
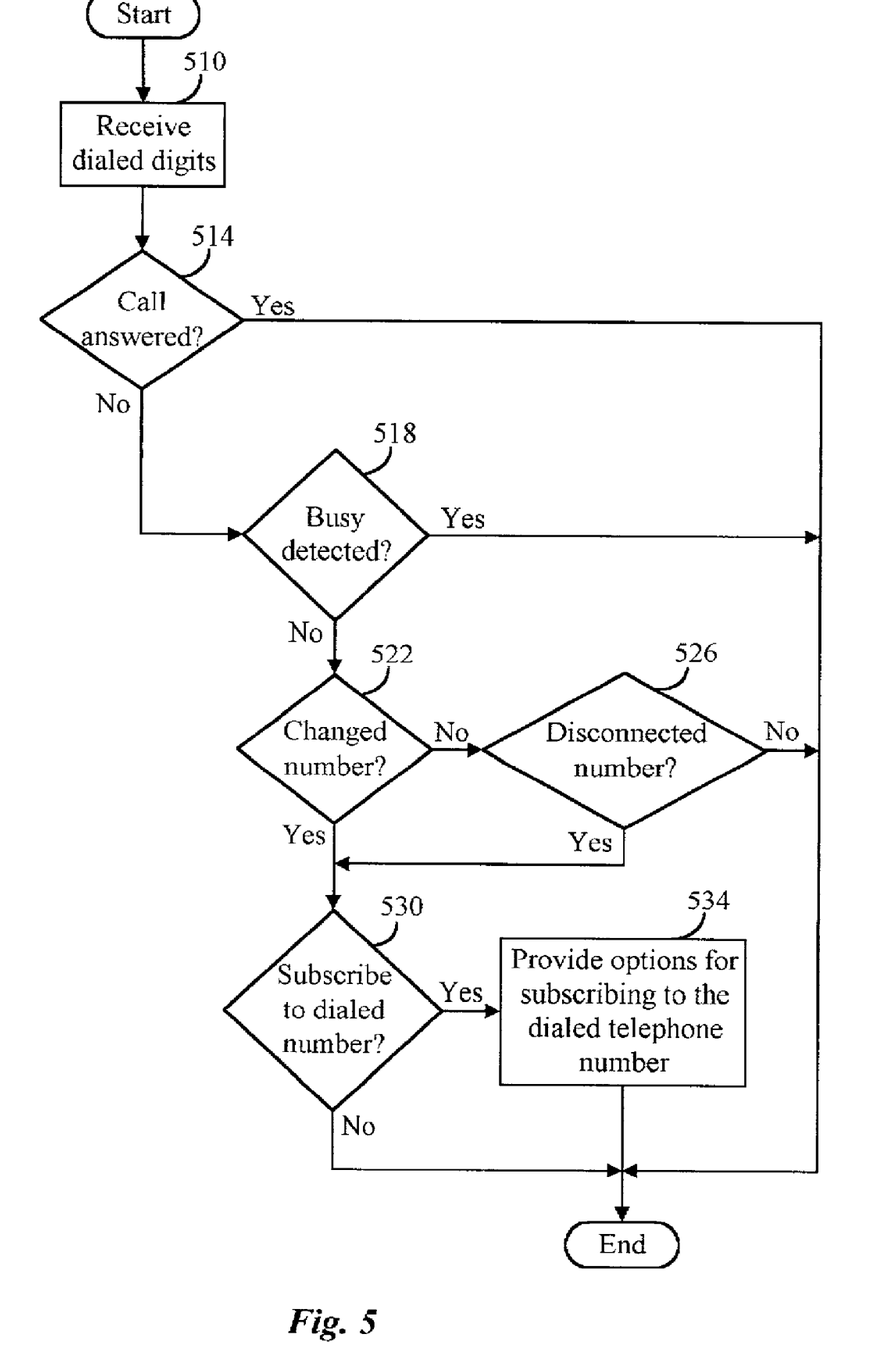
FIG. 5 is a flowchart illustrating the steps performed for providing subscribing options to the caller in accordance with the present invention.

FIG. 5 is a flowchart illustrating the steps performed for providing subscribing options to the caller. Principles of the present invention are illustrated in this general process flow of a telephone call from a calling party to a called party. The process may begin when a calling party places a call to a called party by entering the called party's telephone number. A telecommunications carrier may then route the call to the appropriate calling party as is known in the art.

When dialed digits are received in step 510, it may be determined in step 514 whether the system determines if the call has been answered by the called party. If the call is not answered by the called party, the process detects why that telephone call has not been completed and may provide the calling party with several options within the original call flow. In step 518, the process determines whether a busy signal exists at the called party's telephone. If a busy signal is not detected the system determines at step 522 whether or not the called party's number has been changed. If the number of the called party has not been changed, the process continues and detects whether the called party's telephone number is out of service or disconnected at step 526. When it is determined that the called party's number has been changed (step 522) or when it is determined that the called party's number has been disconnected (step 526) then it may further be determined in step 530 whether the calling party would like to subscribe to the called party's telephone number. When this is the case, further options may be provided in step 534 for subscribing to the dialed telephone number. Options may include menu options, for example. A 10-key voice menu system may be populated with choices for each generated available phone number for a subscriber to select from, or the interaction between a provider/operator and subscriber/registrant may be considered further means of notification as well.

Figure 6:
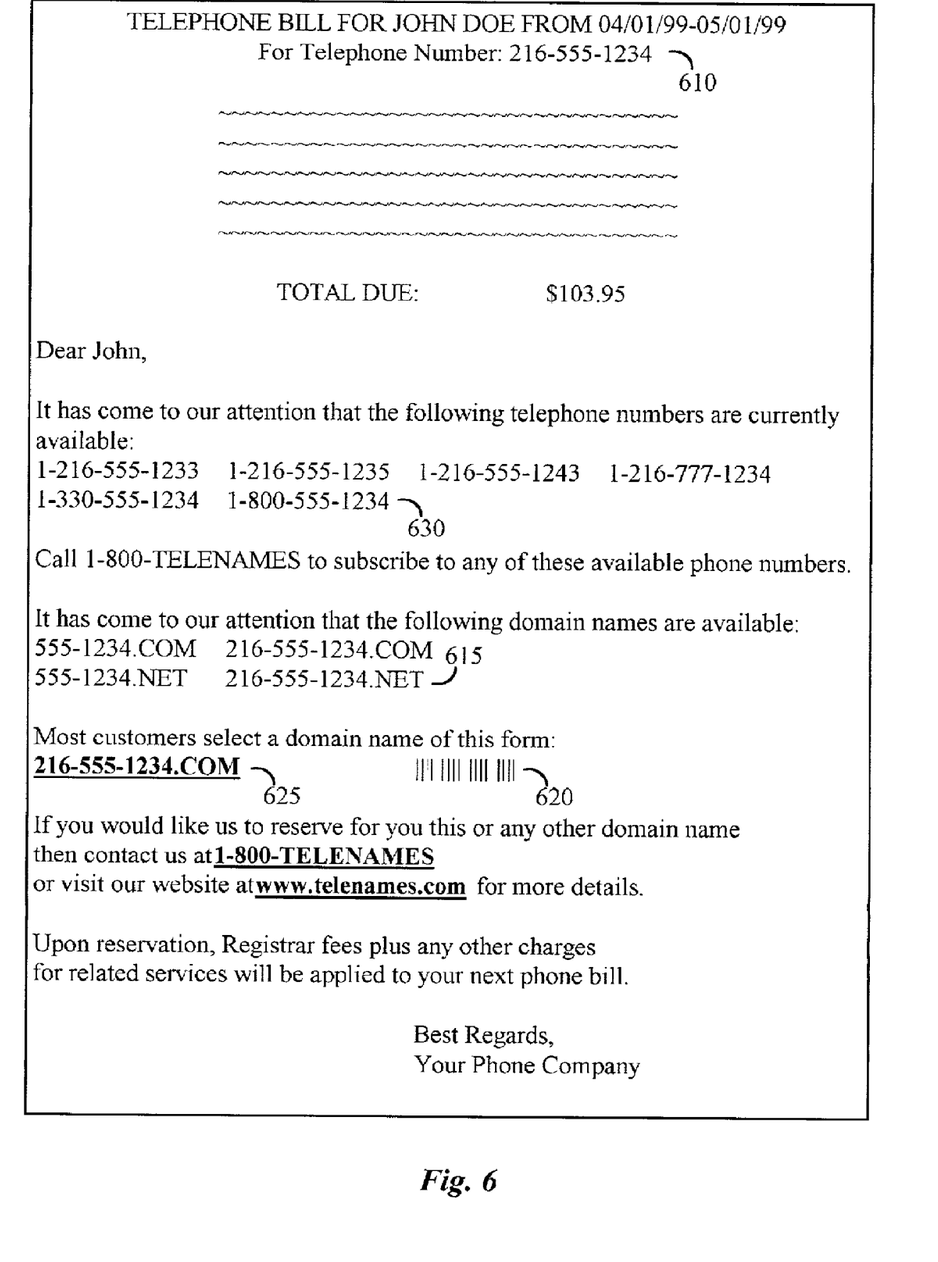
FIG. 6 is an illustration of a document or message that suggests the availability of an identifier of potential interest to the recipient in accordance with the present invention.

FIG. 6 illustrates how modifications may be made to a bill/invoice, renewal notice such as a phone bill that is printed/distributed, faxed, e-mailed, accessed electronically, or from a computer readable medium, etc. The telephone number of a subscriber may serve as a first identifier 610. The printing or displaying of at least one available second identifier 615 (in this case a domain name or the like), which may be similar to the first identifier 610. Encoded on a printed phone bill is machine readable code 620 that when read by a network access device 110 can decode the desired available identifier 615 and a subscriber code such as the first identifier 610 from the machine readable code to generate and access content from a URI that performs the function (not shown) of automatic registration of the available identifier 615. When the phone bill is accessed online, a hyperlink 625 may be included in the phone bill for the automatic registration of the available identifier through a registration form 171. The extra step of confirming the current availability of the identifier may be performed in real time via an identifier registry/identifier status cache 174, or the like. Also included in the phone bill is a preferred choice of at least one identifier from a plurality of available identifiers.

In addition, the suggestion or the temporary reservation of similar or matching telephone identifiers 630 either available or newly available across other area codes is another variation for the suggestive selling of identifiers (e.g., customer has the number 1-216-555-1234 and it is determined that a neighboring area code or another area code such as a toll-free area code has the number 1-330-555-1234, 1-800-555-1234, or mnemonic equivalent is available for subscription). Also shown are available phone numbers that are consecutive/contiguous or have digit reversals, etc. Each available phone number may differ by at least one digit from the subscriber phone number. Other differences may include numbers having the same area code, same central exchange, and same block of 10, 100, 1,000 or 10,000 numbers.

A distributed database of telephone numbers may be maintained in a reverse hierarchy as discussed in U.S. patent application Ser. No. 09/440,606 filed Nov. 15, 1999, by Schneider, entitled "Method and apparatus for information delivery". For instance, a "1234" database can be maintained having data records representing telephone numbers across scattered geographies in the form of NPA-NXX-1234. A "1234" control/reference file is sent, so that at any given point in time, the availability of telephone numbers ending with the number "1234" may be more readily determined due to the minimized transmission of reference data. U.S. patent application Ser. No. 09/650,827 filed Aug. 30, 2000, by Schneider, entitled "Method, product, and apparatus for determining the availability of similar identifiers across naming systems" discusses how available phone numbers may be determined in response to the detection of calling party's or subscriber's phone number.

Figure 7A:
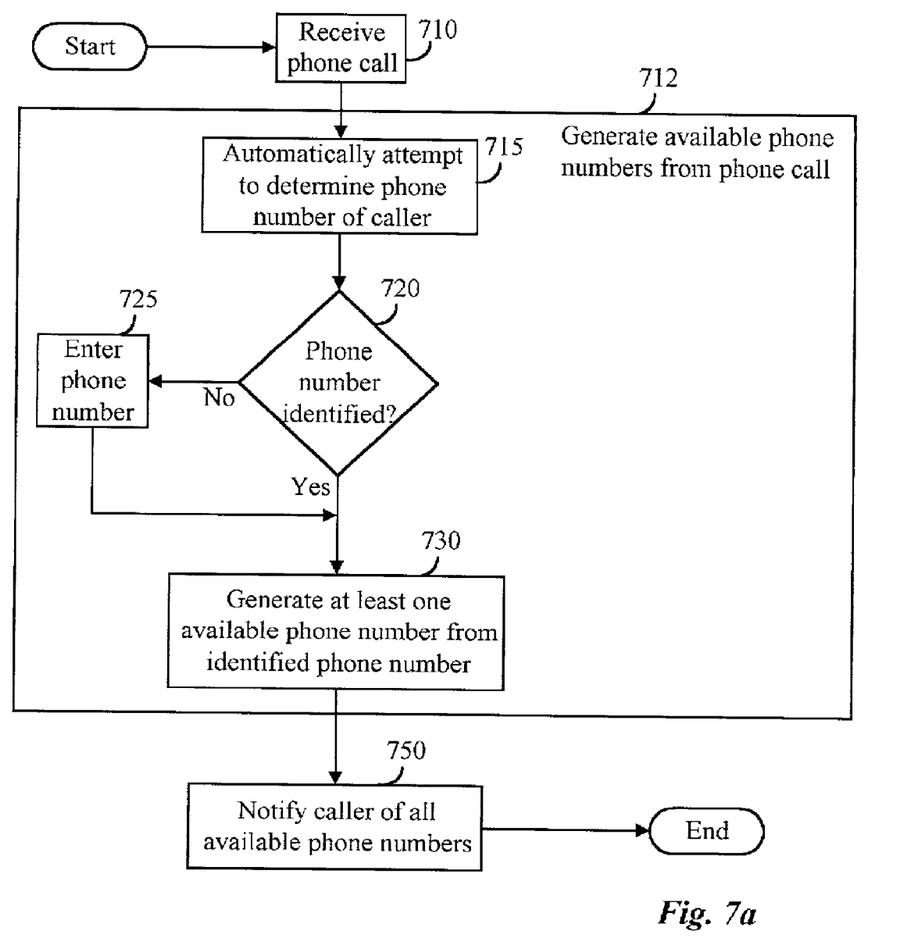
FIG. 7a is a flowchart illustrating the steps performed for determining personalized available identifiers in other naming systems in response to determining a first identifier in accordance with the present invention.

FIG. 7*a* illustrates the steps performed for using a device capable of identifying an identifier such as a telephone number that is included as part of a push name sales system, or integrated into a telephone order and service system 306. When a call is received in step 710, available phone numbers may be generated in step 712, in response to receiving the phone call. A device attempts to determine in step 715 a phone number (e.g., caller ID), or any other identifiers with respect to the origin or login ID of a caller. When a phone number is not identified in step 720, then the caller may be prompted to enter in step 725 a phone number or login ID. At least one available phone number may be generated in step 730 in response to the phone number or login ID. The caller may then be notified in step 750 of all available phone numbers. Audio and/or visual notification may be presented or sent via e-mail. In addition, a 10-key voice menu system may be populated with choices of each generated available phone number for a subscriber to select from, or the interaction between a provider/operator and subscriber/registrant may be considered further means of notification as well.

Personalized phone numbers may be generated in response to caller ID, user logins, automated dialing programs, bulk message programs, and the like. Before dialing a predetermined telephone number, an automated dialer program 175 may be modified to determine phone number availability of interest to the recipient in advance and used to generate a customized sales greeting accordingly, enabling the possibility of suggesting available phone numbers and offering more value and opportunity to the recipient of the phone call. A bulk e-mail program 176 may be used in a similar manner. Before sending e-mail to a recipient, available phone numbers that correspond to the username or some other attribute may be customized as part of the message content. These names may be hyperlinked, so that when a recipient activates such a link, a streamlined personalized registration form 171 can be presented for the recipient to register the suggested available phone numbers.

In another example, a subscriber may login to an Internet Service Provider (ISP), the caller's phone number can be determined and used to customize the results of a starting web page or send an e-mail to the user indicating that there may be available phone numbers, in response to the determination of a first identifier in this case being the telephone number or username of the caller. Any telephone service center may readily integrate available phone number determination and/or registration services as part of their existing line of services. The system may be a dedicated automated service for the determination, selection, and registration of such phone numbers or a provider/operator/service representative may use the information determined by the system in response to assisting the customer/subscriber/registrant with available phone number selection and/or registration services. In addition, subscribers of phone services, ISP services, domain name services, and other services usually supply contact information such as street address, e-mail address, etc. to their respective provider. Such contact information may be used to contact the subscriber via mail, e-mail, web page, fax, pager, etc.

Figure 7B:
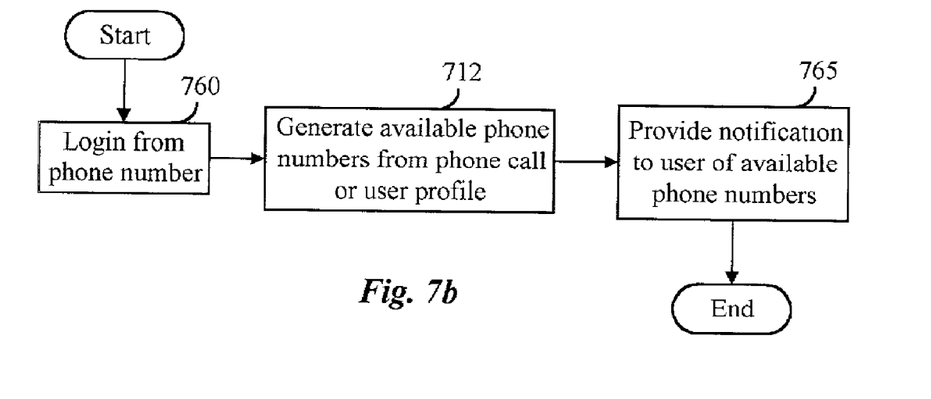
FIG. 7b is a flowchart illustrating the steps performed for determining personalized available identifiers in to a user login in accordance with the present invention.

FIG. 7b is a flowchart illustrating the steps performed for determining available phone numbers in response to a user login in accordance with the present invention. After a user has logged-in, in step 760, available phone numbers may be generated in step 712, in response to the phone call and/or user profile/subscriber watch/filter list 172. Notification may then be provided in step 765 to the user of any available phone numbers of interest. In addition, a 10-key voice menu system may be populated with choices for each generated available phone number for a subscriber to select from, or the interaction between a provider/operator and subscriber/registrant may be considered further means of notification as well.

A communication may be received from the subscriber. The received communication is any communication other than that of a subscriber initiated request for subscribing to an available phone number. The received communication from the subscriber may be received from one of a phone call, mailpiece, and network communication. The mailpiece may be one of a portable storage media, letter, postcard, and utility bill, the phone call may be one of a voice, data, and fax, and the network communication may be one of a URI, e-mail, bill, and web page data.

Communication with the called party may include presenting a menu having options for one of a contacting the calling party and subscribing to at least one available second phone number. Dialed digits entered by the calling party may be received on a telephone keypad, the digits identifying a selected one of the options listed in the menu. Received speech from the calling party may be captured, the captured speech identifying a selected one of the options listed in the menu. A subscriber filter list having at least one second phone number may be received before determining whether the at least one second phone number is available. Determining that at least one second phone number is available may include comparing the generated second phone number to the filter list.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

The invention claimed is:

1. A method for a provider notifying a telephone subscriber having a first telephone number of a second telephone number available for subscription, comprising:
   generating by a processor in operative association with a communication network the second telephone number mnemonically related to said first phone number;
   determining by a processor in operative association with said communication network that the second telephone number is available for subscription; and,
   notifying the telephone subscriber through said communication network of availability of the second telephone number wherein said generating step, said determining step, and said notifying step are initiated and performed by said provider with no input or request from the telephone subscriber.

2. The method, as set forth in claim 1, further including receiving a request from the telephone subscriber to one of a subscribe to and reserve the second telephone number in response to said notifying the telephone subscriber.

3. The method, as set forth in claim 1, wherein said notifying the telephone subscriber includes automatically pushing notification to the telephone subscriber in response to determining that the second telephone number is available for subscription.

4. The method, as set forth in claim 1, wherein said notifying the telephone subscriber includes at least one of a placing a phone call, sending a mailpiece, sending a network communication, and in response to receiving a communication from the subscriber wherein said communication is not a subscriber initiated request for an available telephone number.

5. The method, as set forth in claim 4, wherein said communication from the telephone subscriber is received from at least one of a telephone call, mailpiece, and network communication.

6. The method, as set forth in claim 5, wherein said mailpiece is one of a portable storage media, letter, postcard, and utility bill, said phone call is one of a voice, data, and fax, and said network communication is one of a URI, e-mail, bill, and web page data.

7. The method, as set forth in claim 1, further including generating said mnemonic relationship of the second telephone number from the first telephone number.

8. The method, as set forth in claim 7, wherein both the first telephone number and the second telephone number includes same digits and said mnemonic relationship of the second telephone number is a different order of said digits with respect to the first telephone number.

9. The method, as set forth in claim 7, wherein the first telephone number and the second telephone number includes a same amount of digits and said mnemonic relationship of the second telephone number differs by at least one digit with respect to the first telephone number.

10. The method, as set forth in claim 7, wherein said mnemonic relationship of said generated second telephone number is at least one of a contiguous, same area code, same central exchange, and same block of 10, 100, 1,000 or 10,000 numbers with respect to the first telephone number.

11. The method, as set forth in claim 1, wherein said notifying the telephone subscriber includes processing a telephone call in the communication network to the first telephone number.

12. The method, as set forth in claim 11, wherein said processing said phone call includes receiving dialed digits from a calling party corresponding to the first telephone number, placing a telephone call connection from said calling party through the communication network to a called party of the first telephone number, and communicating with said called party to determine whether said called party is interested in subscribing to the second telephone number.

13. The method, as set forth in claim 12, wherein said telephone call connection between said calling party and said called party is placed through one of a land line public switched telephone network, cellular network, AIN network, ATM, and IP telephony.

14. The method, as set forth in claim 12, wherein said calling party is one of a service provider, telephone operator, and directory assistance provider.

15. The method, as set forth in claim 12, wherein said communicating with said called party includes presenting a menu including options for one of a contacting said calling party and subscribing to the second phone number.

16. The method, as set forth in claim 15, further including receiving dialed digits entered by said calling party on a telephone keypad, said digits identifying a selected one of said options listed in said menu.

17. The method, as set forth in claim 15, further including receiving speech captured from said calling party, said captured speech identifying a selected one of said options listed in said menu.

18. The method, as set forth in claim 1, further including receiving from the telephone subscriber a filter list having the second telephone number before determining whether the second telephone number is available for subscription.

19. The method, as set forth in claim 18, wherein said determining that the second telephone number is available for subscription includes comparing the second phone number to said filter list.

20. A method for a provider notifying one or more telephone subscribers comprising:
generating by a processor in operative association with a communication network a first list having at least one telephone number determined available for subscription;
generating by a processor in operative association with said communication network a second list having at least one subscriber telephone number and contact information for each said telephone subscriber wherein each said subscriber telephone number is mnemonically related to said at least one telephone number available for subscription; and,
notifying said one or more telephone subscribers corresponding to said second list through said communication network, the availability of said at least one available telephone number from said second list mnemonically related to said at least one subscriber telephone number from said first list wherein said generating steps and said notifying step are initiated and performed by said provider with no input or request from the one or more telephone subscribers.

21. A method for a provider notifying one or more telephone subscribers comprising:
discovering by a processor in operative association with a communication network that a first telephone number is available for subscription;
generating by a processor in operative association with said communication network one or more second telephone numbers that are mnemonically related to said first telephone number;
determining by a processor in operative association with said communication network that at least one second phone number is not available for subscription, said at least one second phone number corresponding to the one or more telephone subscribers; and,
notifying the one or more telephone subscribers through said communication network, the availability of said first phone number wherein said discovering step, said generating step, said determining step, and said notifying step are initiated and performed by said provider with no input or request from the one or more telephone subscribers.

* * * * *